United States Patent Office.

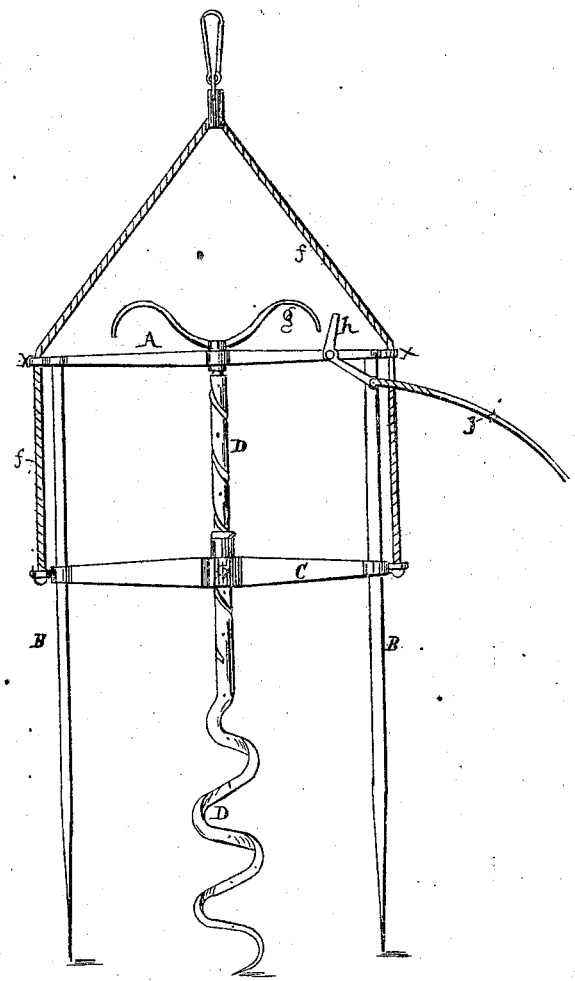

HENDERSON WILLARD, OF GRAND RAPIDS, MICHIGAN.

Letters Patent No. 79,173, dated June 23, 1868.

IMPROVEMENT IN HORSE HAY-FORKS.

*The Schedule referred to in these Letters Patent and making part of the same.*

TO ALL WHOM IT MAY CONCERN:

Be it known that I, HENDERSON WILLARD, of Grand Rapids, in the county of Kent, and in the State of Michigan, have invented certain new and useful Improvements in Horse Hay-Forks; and do hereby declare that the following is a full, clear, and exact description thereof, reference being had to the accompanying drawings, and the letters of reference marked thereon.

In the annexed drawings, making a part of this specification, A represents a horizontal metallic bar of any suitable dimensions, having the two vertical parallel tines or forks B B secured to it, and provided with a suitable bearing for the spiral or worm-screw D, and with holes $x$ $x$, through which the cord or rope $f$ works.

The tines B B are made smooth, and of any desired size and shape, and are securely fastened to the horizontal bar A.

C represents a movable metallic bar, provided with suitable holes near its extremities, through and in which the tines B B work, and with suitable loops, into which the ends of the cord $f$ are fastened.

The movable bar C is also provided with or has a screw-thread cut in a hole through its middle, in which fits and works the shank of the worm-screw D.

D represents a spiral or worm-screw, the shank or upper end of which is provided with screw-thread, which works in and operates the movable bar C up and down.

The worm-screw D is adjusted vertically in the two horizontal parallel bars A and C, the upper end being loosely secured in the bar A, and having a suitable lever or handle, $g$, fastened to it, by which means said screw D is operated.

Attached to the cross-bar A is a small lever-catch, $h$, in the form shown in the drawings, and is designed to catch and hold the lever $g$, and thereby prevent the turning of the screw D whenever desired.

By means of a cord, $j$, the catch $h$ is detached from the lever or handle $g$, as may be required, and then the worm-screw D may turn and the movable bar C slide up on the tines B B. Power to elevate is attached to a suitable loop, to which the cord $f$ is fastened.

By inserting the tines B B, and at the same time turning the worm-screw D to the right by means of the handle or lever $g$, the whole works down into the hay, and the movable bar C is forced down and makes a convenient and secure binder against the top of the hay. Then adjust the catch-lever $h$ so as to prevent the screw D from turning, and the fork and hay are ready to be raised wherever required. When the same has been elevated by pulling on the cord $j$, the catch $h$ is detached and the screw D is turned backward by the weight of the hay, which is thereby detached from the fork.

Having thus fully described my invention, what I claim as new, and desire to secure by Letters Patent, is—

The arrangement of the horizontal bars A and C, and tines B B, with the worm-screw D, levers $g$ and $h$, and cords $f$ and $j$, when used as and for the purpose herein fully set forth.

In testimony that I claim the foregoing, I have hereunto set my hand, this 12th day of February, 1868.

HENDERSON WILLARD.

Witnesses:
GEORGE C. PEIRCE,
JOS. H. WALKER.